E. DAVIES, Jr.
Wheel-Cultivator.
No. 68,848
Patented Sept. 17, 1867.
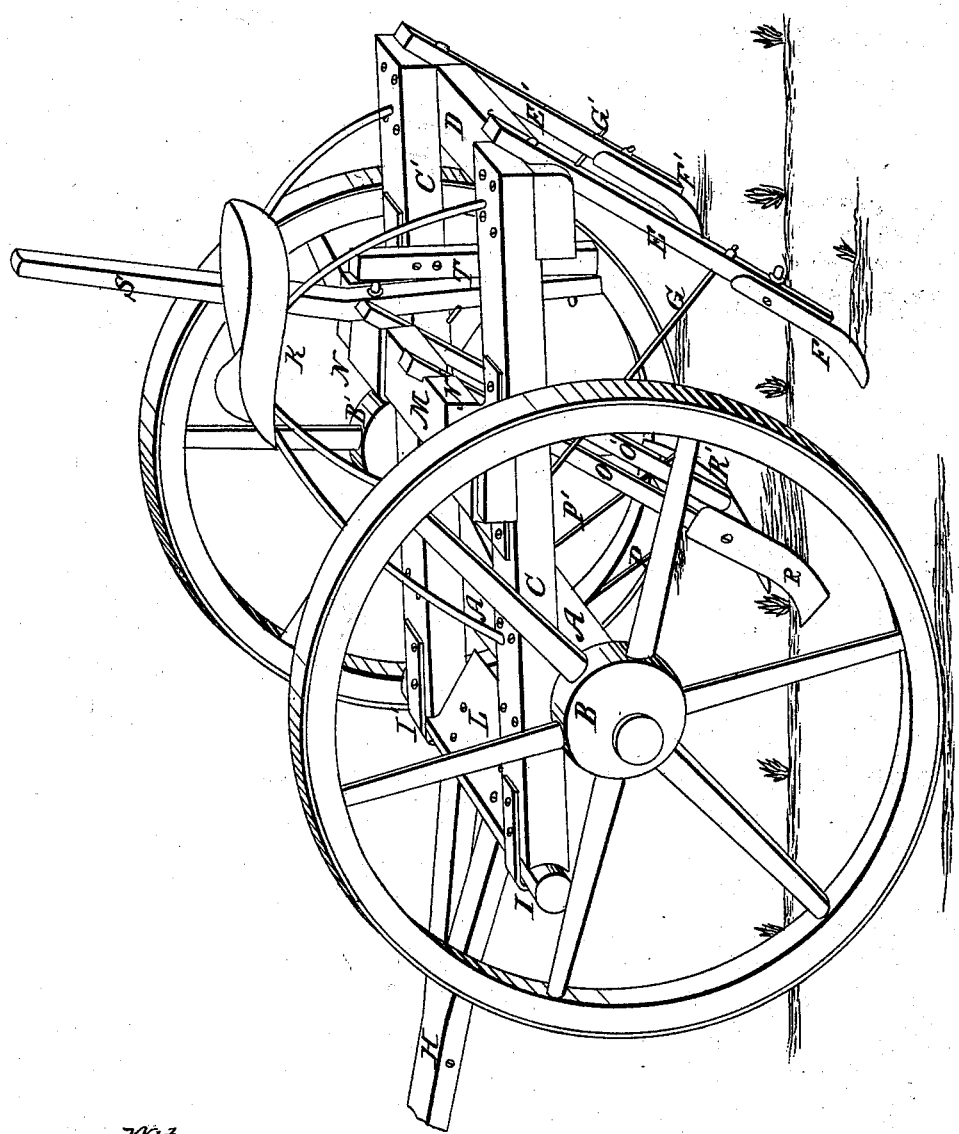
Witnesses:
Elliott Davies Senr.
Samuel Jacob Wallace
Inventor:
Elliott Davies, Junr.

United States Patent Office.

ELLIOTT DAVIES, JR., OF CARTHAGE, ILLINOIS.

Letters Patent No. 68,848, dated September 17, 1867.

IMPROVEMENT IN CULTIVATORS.

*The Schedule referred to in these Letters Patent and making part of the same.*

TO ALL WHOM IT MAY CONCERN:

Be it known that I, ELLIOTT DAVIES, Jr., of Carthage, in the county of Hancock, and State of Illinois, have invented a new and useful Improvement in Cultivators; and I do hereby declare the following to be a full, clear, and exact description thereof, reference being had to the accompanying drawings, and to the letters of reference marked thereon, in which—

Figure 1 is a side perspective view of my improved cultivator.

The object of this invention is to improve the construction and working of cultivators for operating on both sides of a row of plants, and on which the driver rides, supported by wheels.

This improved cultivator consists of a peculiar construction and arrangement and combination of parts, mostly well known, for such use separately as set forth hereinafter and shown in the drawings.

On the main axle A are mounted the wheels B B', and the side pieces C C' to form the main frame. The pieces C C' are connected at their back ends by the cross-piece D. To this piece D, near its ends, are fixed the pieces E E', which extend down and bear the ploughs F F', and have stay-rods G G' extending up and forward to the pieces C C'. The tongue H is hinged to the front ends of the pieces C C' at I I', so that the main frame A C C' D can balance or tilt on the axle of the wheels B B', and the driver riding in the seat K can step on to part L of the tongue A, and tilt the back part of the main frame up and lift thereby the connected ploughs to throw them out of the ground. The cross-head M is mounted at its ends on pieces C C', which have clasps N N' to secure it loosely so that it may be free to play back and forth endwise. Pieces O O' are fixed to this cross-head M, and have stay-rods P P' reaching up and forward to piece A, and bear at their lower ends the inside set of ploughs R R' to pass on the two sides of the row. The lever S is pivoted at its lower end to part T, which extends down from the piece C', and is pivoted to the cross-head M, so that the driver from his seat K can move the upper end of the lever S back and forth sideways, and thereby slide the pivoted cross-head M, with its connected ploughs R R', to either side so as to follow the row of plants.

What I claim as new, is—

1. The lever S, in combination with the sliding cross-head M mounted on side pieces C C', and bearing pieces O O', connected by stay-rods P P' to main axle A, and bearing the two inside ploughs R R', all substantially as specified.

2. The stationary back ploughs F F', connected to the cross-piece D, in combination with the side pieces C C', the sliding cross-head M, with its ploughs R R', the wheels B B', seat K, and the tongue H, hinged to ends of pieces C C', all substantially as specified.

ELLIOTT DAVIES, JR.

Witnesses:
ELLIOTT DAVIES, Sr.,
SAMUEL JACOB WALLACE.